United States Patent

[11] 3,588,417

[72] Inventors Hans Gott;
Josef Ritter; Klaus Ritter, Graz, Austria
[21] Appl. No. 857,363
[22] Filed Sept. 12, 1969
[45] Patented June 28, 1971
[73] Assignee EVG Entwicklungs-u.
Verwertungsgesellschaft m.b.H.
Graz, Austria
[32] Priority Oct. 14, 1968
[33] Austria
[31] 10032/68

[54] WIRE MESH WELDING MACHINE
13 Claims, 3 Drawing Figs.
[52] U.S. Cl. ..................................................... 219/56, 219/87
[51] Int. Cl. ............................................. B21f 15/08, B21f 27/10
[50] Field of Search ........................................... 219/56, 57, 58, 87, 88

[56] References Cited
UNITED STATES PATENTS
2,155,095 4/1939 Kramer .......................... 219/56
2,957,070 10/1960 Schachter et al. ............ 219/56X Primary Examiner—J. V. Truhe
Assistant Examiner—Hugh D. Jaeger
Attorney—Ernest F. Marmorek ABSTRACT: A wire mesh welding machine of the kind in which there are two rows of welding electrodes extending across the machine and the longitudinal wires of the mesh are moved step by step between the electrodes to enable the transverse wires to be welded to them, has its electrodes arranged so that their spacing is continuously variable to enable the spacing of the longitudinal wires transmitting the mesh to be varied. For this purpose the machine has thrust transmitting devices for applying a welding thrust to the electrodes mounted so that they can be shifted in position across the machine and it also has electric conductor rails along which a pair of contact shoes for each pair of electrodes are slidably mounted below the plane of advance of the mesh through the machine. Each pair of contact shoes are mechanically joined together but electrically insulated from each other to form a single structural unit, one contact shoe supporting one electrode of the pair and this first electrode being situated below the plane of advance of the mesh. The second contact shoe is connected electrically through a conducting path which passes through the plane of the mesh to the second electrode which is situated above the plane of the mesh and is connected mechanically through a connecting piece which passes through the plane of the mesh to one of the thrust transmitting devices by which a support for the second electrode is movable upwards and downwards. Further, a common thrust beam which extends across the machine is provided for applying a thrust to all the thrust transmitting devices.

WIRE MESH WELDING MACHINE

In constructing wire mesh welding machines, in which the longitudinal wires are welded to the transverse wires at the crossing points by electric resistance welding, it is desirable to install the welding transformers below the plane of the mesh as it moves through the machine, the transformers being fixed in position. The welding electrodes extend in a row across the direction of movement of the mesh through the machine, that is to say across the line of advance of the longitudinal wires. To allow the machine to be adjusted to provide different longitudinal wire spacings it is known to install electric conductor rails extending transversely under the plane of the wire mesh. Each pair of electrodes has two pickup contacts, or contact shoes, which slide transversely over the surfaces of the two electric power supply rails. Each welding electrode, of each pair, is supported by its own sliding contact shoe. The pairs of electrodes, each consisting of an upper electrode and a lower electrode, are spaced apart transversely at spacings which correspond to the desired longitudinal wire spacings.

In these known machines the welding is effected by what is known as the "double point method." By this method the welding current passes from one electrode through a wire crossing point and then, on the other side of the plane of the mesh, through a passive current bridge across to the neighboring wire crossing point, and finally to the second electrode so that each of these welding circuits, comprising two electrodes and a bridge, welds at two wire crossing points simultaneously. However this arrangement does not allow an easy change to a different longitudinal wire spacing. To make the change it is necessary to substitute current bridges of different lengths and to shift one current bridge supports. For this purpose, in these known machines, each current bridge is mounted detachably on a thrust member which is arranged to slide across the machine for adjustment in position, so that transverse adjustment can be obtained to change the length of each double point welding bridge and also to change the transverse spacing between the middle points of the bridges. This method of adjustment is cumbersome and time consuming, involving numerous individual adjustments to the electrodes situated under the plane of the mesh, and to the current bridges situated above the plane of the mesh, and also usually involving an exchange of current bridges.

A mesh welding machine of different construction is also known, in which each pair of electrodes consists of a single electrode under the plane of the mesh and a single electrode above the plane. With this arrangement each pair of electrodes welds only a single wire crossing point. To allow continuously variable adjustment of the longitudinal wire spacing each pair of electrodes is combined, to form a single structural unit, with its own welding transformer and with its own thrust member, for example a hydraulic ram, for squeezing the crossed wires together during the welding. This combined structural unit can be slid along the transverse current rails and locked in position where desired.

This known mesh welding machine has the disadvantage that the displaceable structural units, each consisting of a welding transformer, two electrodes, two electrode supports, a hydraulic ram and a supporting structure, are heavy and occupy a great deal of space, particularly in view of the fact that the supporting structure has to be robust because it has to take the reactive thrust during the welding without bending excessively. A further disadvantage of this known machine is that the displaceable transformers require mobile cable connections, that is to say either long flexible electric cables or a system of electric plugs and sockets. The hydraulic connections for the individual rams must also be flexible and comparatively long. All this results in a complexity of supply lines, involving an increased probability of trouble.

The object of the present invention is, to provide means for effecting continuously variable adjustment of the longitudinal wire spacing whilst avoiding the difficulties mentioned above in a mesh welding machine in which the welding electrodes are arranged in rows, thrust transmitting devices for applying a welding thrust to the electrodes are mounted so that they can be shifted in position across the machine in a direction at right angles to the direction of advance of the longitudinal wires through the machine, and electric conductor rails, along which a pair of contact shoes for each pair of electrodes are slidable, are mounted below the plane of advance of the mesh through the machine.

To this end, according to this invention in such a machine each pair of contact shoes are mechanically joined together but electrically insulated from each other to form a single structural unit, one contact shoe supporting one electrode of the pair, this first electrode being situated below the plane of advance of the mesh, the second contact shoe being connected electrically through a conducting path which passes through the plane of the mesh to the second electrode which is situated above the plane of the mesh and being connected mechanically through a connecting piece which passes through the plane of the mesh to one of the thrust transmitting devices by which a support for the second electrode is moveable, and a common thrust beam which extends across the machine is provided for applying a thrust to all the thrust transmitting devices.

With this construction, to change the longitudinal wire spacing all that is necessary is to shift a number of welding heads and these are comparatively light in weight each consisting of a contact shoe unit, a thrust transmitting device with its structural connecting piece which connects it to the contact shoe unit, and the two electrodes. The heavy welding transformers are stationary. The thrust applied to the crossed wires, for squeezing them together so as to ensure good electric contact during the welding process, is derived from the transverse beam which does not share the adjustment movements of the welding heads, the squeezing thrust being applied to the electrodes through the comparatively light thrust transmitting devices. It should be observed that the structural connecting member which passes through the plane of the mesh is not subjected to the squeezing thrust, that is to say it needs to support only its own weight and the weights of the parts it carries. It need therefore not be robust in construction. The individual welding heads can be comparatively light in construction, compared with what has been necessary hitherto, and are correspondingly easy and quick to shift in position to adjust the longitudinal wire spacing.

Preferably each thrust transmitting device is mounted to slide vertically on the connecting piece and has a return spring which tends to retract the thrust transmitting device, after the weld has been made, as far as a limiting mechanical stop, in order to separate the electrodes and so allow the wire mesh to be advanced a further step. A thrust spring is provided to transmit the applied thrust to the electrode and to absorb excessive thrusts. With this arrangement, the thrust beam, which extends across the machine, thrusting against each thrust transmitting device, at first moves the device against the influence of the return spring. Once the electrode has made contact with the wire an increasing squeezing pressure is applied, controlled by the thrust spring to suit the particular welding requirements.

When welding wide wire mesh with a wide longitudinal wire spacing it often happens that not all the welding heads are needed. In order to allow some of the welding heads to be put out of action, when they are not needed, the upper end of each thrust transmitting device may be provided with a thrust block which can be retracted, that is to say can be moved out of the way, so that in effect the individual thrust transmitting devices can be engaged and disengaged selectively with the transverse thrust beam. Furthermore, as will be described in greater detail later, each welding head may have attached to it various auxiliary devices, such as guides for the longitudinal wires, mechanical stops for the transverse wires, feeding devices for the transverse wires and the like, in such a way that these auxiliary devices partake in the adjustment movements of the welding heads.

Some examples of mesh welding machines constructed in accordance with the invention will now be described with reference to the accompanying somewhat diagrammatic drawings in which.

Figure 1:
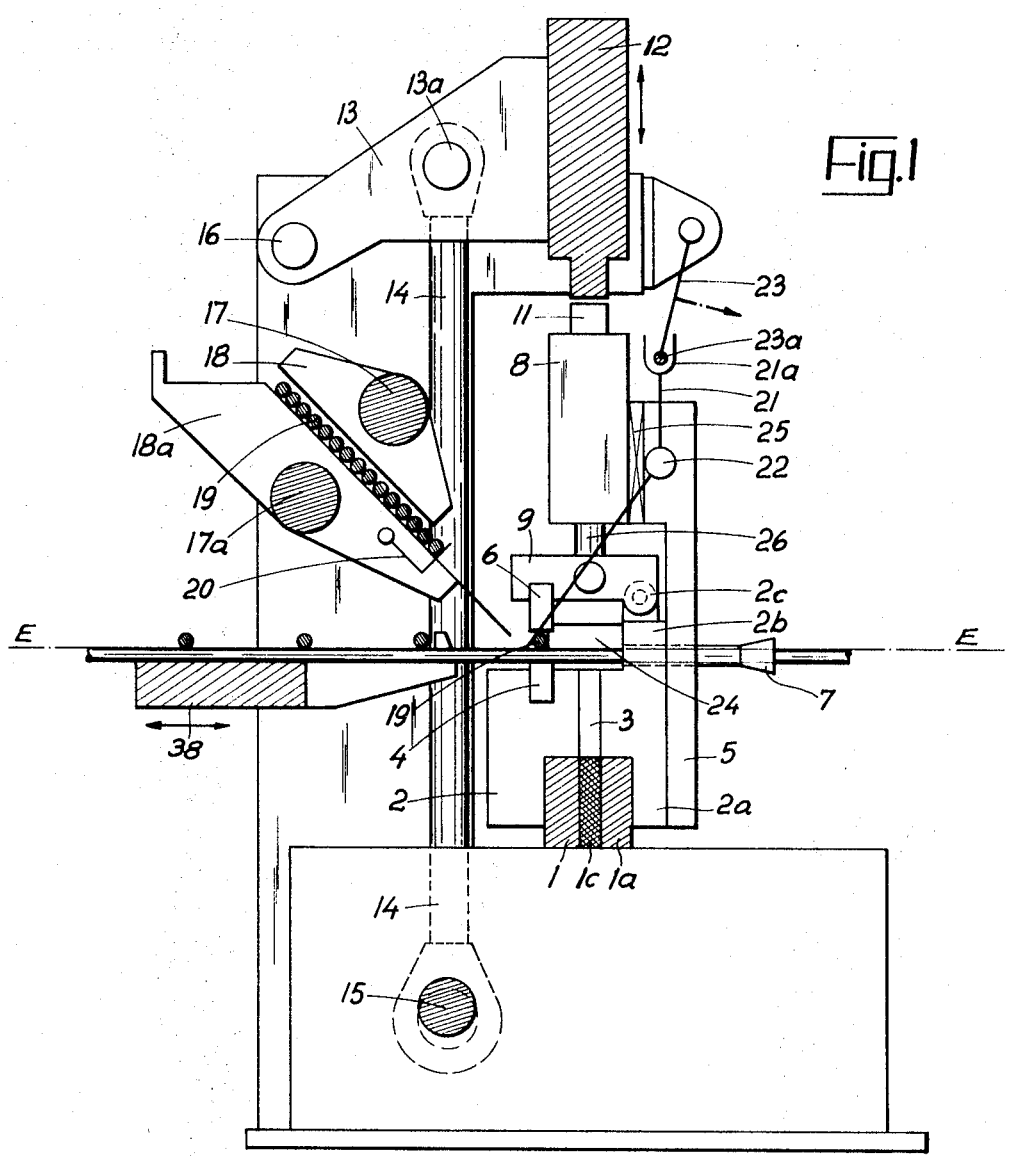
FIG. 1 is a partly sectioned side view of one example.

In the welding machine shown in FIG. 1, two transverse electric current supply rails, 1, 1a, are connected to one or more transformers and are mounted in a frame of the machine. The two rails are separated by an insulating layer 1c. A number of welding heads, only one of which is shown in FIG. 1, are mounted to slide transversely along the rails. Each welding head has two contact shoes, 2, 2a, which pick up current from the rails 1, 1a. The two contact shoes 2, 2a are separated from each other by an electric insulator 3. In the example shown the electric insulator 3 also serves to bond the two contact shoes together mechanically, so that they form a single structural unit. Alternatively of course the two contact shoes can if desired be tied together by insulated bolts or the like.

The contact shoe 2 directly supports a first electrode 4 situated under a plane E of the mesh. The second contact shoe 2a is attached, for example by screws, to a connecting piece 5 which passes through the mesh plane E. The connecting piece 5 is attached to a thrust transmitting device 8 by means of a sliding guide 25. The thrust transmitting device 8 includes a vertical plunger 26 on the lower end of which there is pivoted a contact bridge 9, the end of which contains a second electrode 6, vertically in line with the first electrode 4. All these parts, that is to say the contact shoe unit 2, 2a, 3 containing the first electrode 4, the connecting piece 5, the sliding guide 25, the thrust transmitting device 8, the plunger 26 and the contact-bridge 9 with its second electrode 6, all together form a welding head, which is capable of sliding to enable its position to be adjusted transversely along the electric feeder rail assembly 1, 1c, 1a. Electric contact between the second contact shoe 2a and the second electrode 6, which is situated above the mesh plane E, is obtained as follows: The second contact shoe 2a has an upper projection 2b, projecting above the plane E. The upper projection 2b makes electric contact with the contact-bridge 9, either permanently or only when the welding thrust is being applied. As indicated in broken lines in FIG. 1, the contact-bridge 9 can if desired pivot on a bearing 2c mounted on top of the contact shoe 2a.

A guide 7 for the longitudinal wire is attached to the contact shoe 2a and/or to the connecting piece 5, the guide 7 being aimed towards the gap between the two electrodes 4 and 6. A transverse mechanical stop 24 on each contact shoe 2a ensures that each transverse wire 19 fed between the electrodes 4 and 6 comes to rest in the correct position across the upper surfaces of the longitudinal wires.

Running across the machine, above all the thrust transmitting devices 8 there is a thrust beam 12, which moves downwards to apply the welding thrust and upwards on its return stroke, as indicated by the double arrow in FIG. 1. Each thrust transmitting device 8 is equipped, at its top end, with a retractable thrust block 11, through which the welding thrust is transmitted from the beam 12 to the thrust transmitting device 8. The retractable thrust block 11 allows a welding thrust to be applied selectively to the desired combination of welding heads. In the example shown the transverse beam 12 is supported by pivoted levers 13, which are pivoted to the frame of the machine at 16. A connecting rod 14 is pivoted at 13a to the lever 13, its lower end being driven by an eccentric 15 so that the connecting rod 14 oscillates in the rhythm of the welding and mesh advance operations. During the downward movement of the connection rod 14 the transverse beam 12 moves downwards applying the welding thrust through the thrust block 11 to the upper electrode 6 and so to the crossed wires of the mesh, but only in the case of those welding heads in which the thrust block 11 is in the engaged position.

In FIG. 1 the direction of advance of the mesh is from the right towards the left. Extending across the machine, to the left of the welding heads, there are two transverse beams 17 and 17a, on which guide plates 18, 18a, are supported and these together form a guiding gap along which transverse wires 19 are fed to the welding electrodes. The parts 17, 17a, 18, 18a together form a transverse wire feeder, from which the transverse wires are fed individually to the electrodes by means of an intermittently opening gate 20. When a transverse wire has passed through the gate 20 its position between the electrodes is determined by the mechanical stop 24, against which the wire is pushed by a positioning device which will presently be described. The gate 20, which is represented only diagrammatically in the drawing, ensures that only one transverse wire is fed at a time.

In the example shown in FIG. 1 there is an individual transverse wire guiding device for each welding head. Each guiding device consists of a two-armed lever 21 pivoted at 22 to the connecting piece 5 of the welding head. The shorter arm of the double lever terminates in a fork 21a the longer arm extending to beyond the transverse wire, so that when the lever rocks the longer arm pushes the transverse wire 19 up against the mechanical stop 24. All the two-armed levers 21 are actuated in common by a transverse rod 23a which extends right across the machine and engages with all the forks 21a. The transvers rod 23a is attached to the lower end of a rocking lever 23 which is pivoted to the frame of the machine. The rocking lever 23 is driven, by means not shown in the drawing, in the working rhythm of the machine so that as soon as the mesh advance movement has been completed, but before the welding operation has begun the transverse wire 19 fed through the gate 20 is pushed by the longer arm of the lever 21 against the locating mechanical stop 24.

At the outlet end of the machine, that is to say on the left in FIG. 1, there are the customary intermittently actuated conveyor hooks 38 which effect the advance of the mesh.

Figure 2:
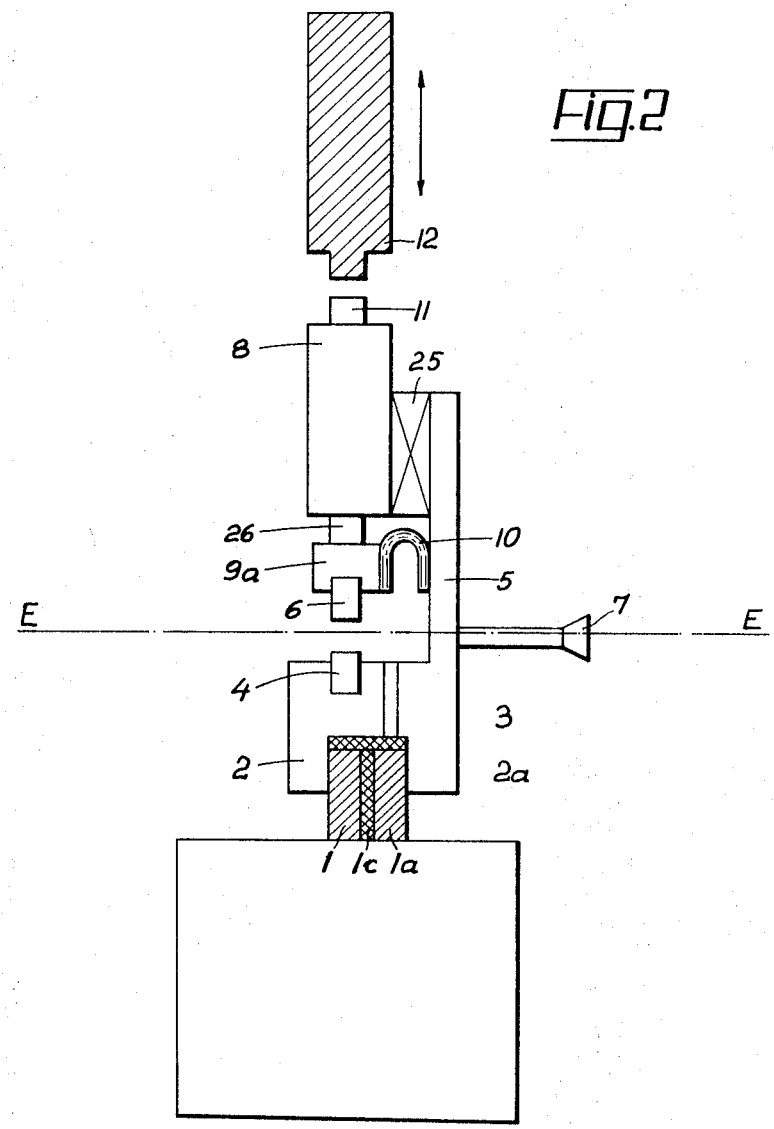
FIG. 2 shows a welding head of a second example.

In the example of a welding head shown in FIG. 2 the electrical connection between the contact shoe 2a and the second electrode 6 is arranged differently from the example in FIG. 1. Instead of a contact-bridge 9 for containing the second electrode 6 there is an electrode holder 9a fixed to the thrust plunger 26. The electric current is transmitted from the contact shoe 2a to the electrode 6 through flexible conductor 10, one end of which is embedded in the connecting piece 5. Or alternatively if desired, instead of the flexible conductor 10, a roller bearing or some other contact means can be used.

Figure 3:
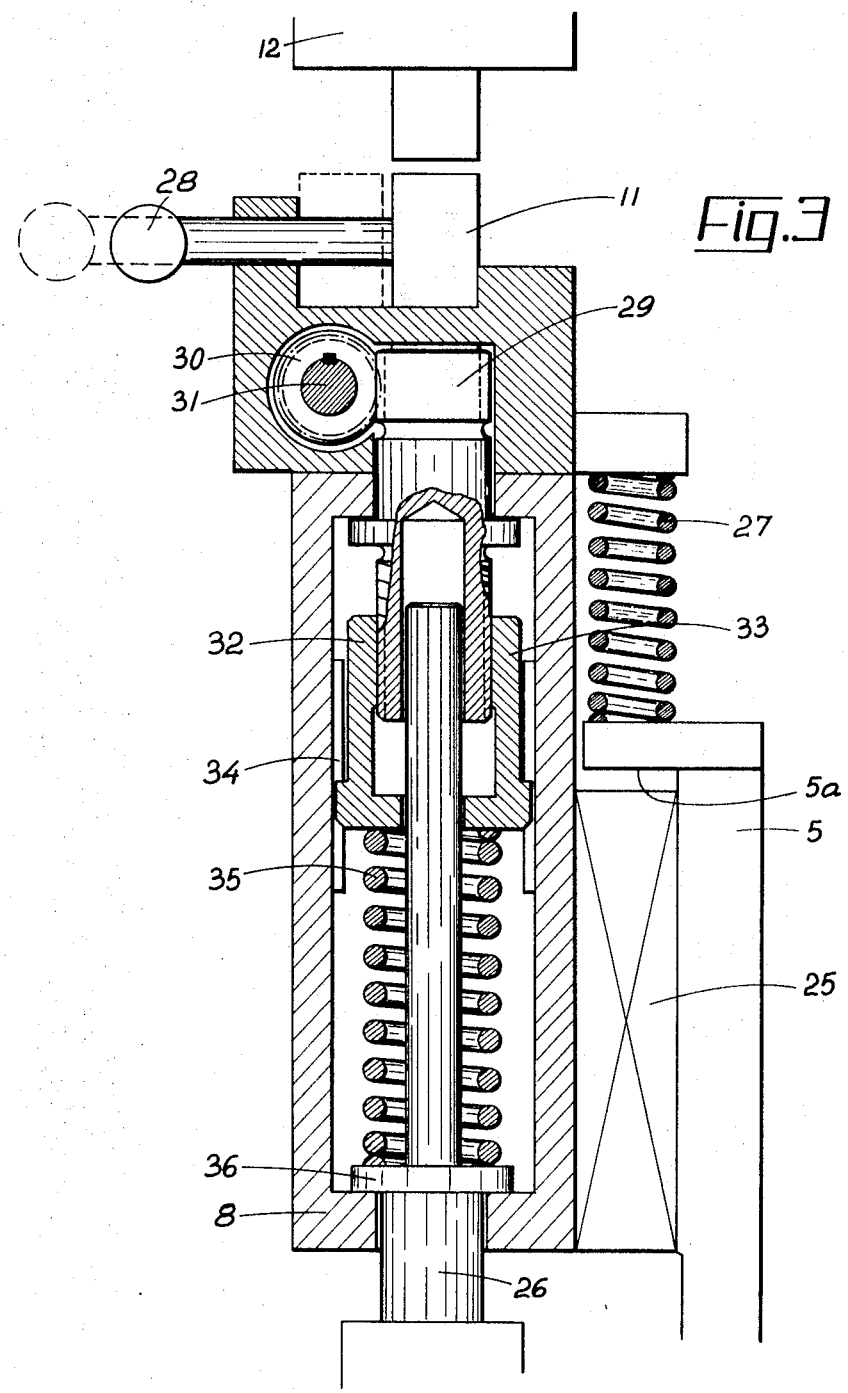
FIG. 3 is a section of a mechanism which forms part of machines constructed in accordance with both of the examples.

FIG. 3 illustrates the construction of the thrust transmitting device 8. The entire thrust transmitting device 8 is mounted to slide by means of the guide 25 upwards and downwards on the connecting piece 5. A return spring 27 tends to hold the entire device up against an upper stop 5a. In the upper end of the thrust transmitting device 8 there is the thrust block 11 which can be retracted, by means of a handle 28, out of the path of movement of the thrust beam 12, so that the individual thrust transmitting devices 8 can be selectively engaged and disengaged, with respect to the thrust beam 12, depending on which of the welding heads are going to be used for the particular welding operation.

A transverse adjustment shaft 31 extends right across the machine. On the transverse shaft 31 driving worms 30, one for each thrust transmitting device 8, are mounted so that they are free to slide along the shaft 31, each driving worm 30 being however keyed to the shaft 31. Each driving worm 30 engages with a worm wheel 29 of an externally threaded adjustment spindle 32, so that rotation of the transverse shaft 31 rotates all the adjustment spindles 32.

Each thrust transmitting device 8 contains an internally threaded sleeve 33, which is prevented from rotating by guide rails 34. Rotation of the adjustment spindle 32 moves the sleeve 33 up or down, that is to say changes the vertical position of the sleeve 33. Between the lower surface of the sleeve 33 and the upper surface of a collar 36 on the thrust plunger 26 there is a compression spring 35. In effect the welding thrust applied by the plunger 26 is the thrust applied by the compression spring 35 to the collar 36, and this thrust can be adjusted in magnitude by adjusting the position of the internally threaded sleeve 33. This arrangement allows the welding thrusts applied by all the welding heads to be adjusted in common, by rotating the transverse shaft 31.

The wire mesh welding machine operates as follows:

Driven by the eccentric 15 the connecting rod 14 reciprocates and imparts an oscillation to the lever 13, which pivots about its pivot bearing 16, giving the thrust beam 12 a rhythmic vertical reciprocation. In its downward movement the transverse beam 12 makes contact with those thrust blocks 11 which are engaged.

Further downward movement of the beam 12 thrusts all the engaged thrust transmitting devices 8 downwards, each sliding in its guide 25. In this movement the return springs 27 shown in FIG. 3 are compressed. As soon as the electrode 6 comes into contact with the transverse wire 19 the downward movement of the electrode 6 ceases and the plunger 26 begins to compress the thrust spring 27, the welding thrust being controlled by this spring. Upward movement of the beam 12 allows each engaged thrust transmitting device 8 to move upwards again, under the influence of its return spring 27. In this movement each thrust spring 35 extends until the collar 36 has returned to its seat, whereupon the electrode 6 is lifted off the wire by upward movement of the plunger 26.

During the remainder of the upward movement of the beam 12, followed by the beginning of a renewed downward movement the wire mesh is advanced one step by the traction hooks 38. A further transvers wire 19 is fed by the gate 20 from the transverse wire storage magazine to the welding electrodes, the transverse wire being at first propelled by gravity and finally pushed by the long arm of the lever 21 up against its locating mechanical stop 24.

When it is desired to readjust the machine to a different longitudinal wire spacing, all that is necessary is to unlock those welding heads which it is desired to shift. The locking devices can be of any suitable construction and are not shown in the drawing. Each welding head is then simply slid into position along the electric feeder rails, without it being necessary to make or break any further working connections. Each welding head is then locked in its new position. Welding heads which are not required can either be removed, or disengaged by retracting the thrust blocks 11.

The examples illustrated and described here can be modified in various ways. For example the thrust transmitting devices can if desired be directly connected to the thrust beam, in which case the beam is preferably made in two parts between which there is a guide for the transverse movements of the thrust transmitting devices. In this case also the welding heads and their thrust transmitting devices are not loaded when they are being slid along the current feeded rails. On the other hand, due to the fact that in this case the thrust transmitting devices share the upward and downward movements of the thrust beam, the second electrodes must be made detachable in a known manner to make inoperative those welding heads which are not required for the particular welding operation.

We claim:

1. In a wire mesh welding machine for making welded wire mesh including longitudinal wires and transverse wires welded to each other at their crossing points, said machine including means for varying the spacing of said longitudinal wires, welding electrodes arranged in two rows across said machine, said electrodes being arranged in pairs, one in each of said rows, thrust transmitting devices for applying a welding thrust to said electrodes in one of said rows, means mounting said devices for movement across said machine to adjust the positions thereof, electric conductor rails, means mounting said conductor rails below a plane of advance of said mesh through said machine, pairs of electrical contact shoes, means slidably mounting said contact shoes on said rails and means electrically connecting said contact shoes one to each of said electrodes, the improvement comprising means mechanically connecting said contact shoes together in pairs, and means electrically insulating each of said pairs of contact shoes from each other whereby said pair of shoes and said insulating means form a contact unit, means supporting and electrically connecting a first electrode of said pair of electrodes from one contact shoe in said contact unit, said first electrode being situated below said plane of said mesh, means electrically connecting a second contact shoe of said contact unit to a second electrode of said pair of electrodes, said second electrode being situated above said plane of said mesh and said electrical connecting means extending through said plane, a connecting piece extending through said plane and mechanically connecting said second contact shoe to one of said thrust transmitting devices, support means for said second electrode, means movably connecting said one thrust transmitting device to said second electrode, a common thrust beam, means mounting said beam extending across said machine and means for operatively connecting said common thrust beam selectively to all of said thrust transmitting devices whereby said beam is capable of applying a thrust to all of said devices and through said devices to all of said second electrodes simultaneously.

2. A wire mesh welding machine as claimed in claim 1, further comprising longitudinal wire guide means, means mechanically attaching said guide means to said contact unit or to said connecting piece, said guide means being adapted to guide a longitudinal wire through a gap defined between said pair of electrodes corresponding to said contact unit.

3. A wire mesh welding machine as claimed in claim 1, further comprising mechanical stop means mounted on each of said contact units, said stop means being adjacent said electrodes for locating said transverse wires in position between said electrodes in said two rows for welding said transverse wires to said longitudinal wires.

4. A wire mesh welding machine as claimed in claim 1, further comprising pivoted contact-bridge means on the lower end of each of said thrust transmitting devices, support means for said second electrode on one end of said contact-bridge means and a contact piece on the other end of said contact-bridge means, said contact piece connecting said contact-bridge means electrically to said second contact shoe.

5. A wire mesh welding machine as claimed in claim 4, further comprising a projection projecting from said second contact shoe to a point above said plane of said mesh and means pivotally mounted said contact-bridge means on said projection.

6. A wire mesh welding machine as claimed in claim 1, further comprising electrode holder means holding said second electrodes, means mounting said holder means on said thrust transmitting devices and flexible conductor means forming an electrical connection between said holder means and said connector pieces.

7. A wire mesh welding machine as claimed in claim 1, further comprising electrode holder means holding said second electrodes, means mounting said holder means on said thrust transmitting devices and electrical roller contact means forming electrical connections between said holder means and said connecting pieces.

8. A wire mesh welding machine as claimed in claim 1, further comprising means mounting said thrust transmitting devices on said connecting pieces for vertical sliding movement, mechanical stop means on said connecting pieces, return spring means urging said thrust transmitting devices against said mechanical stop means to separate said first and said second electrodes and thrust spring means transmitting said thrust from said thrust transmitting devices to said second electrodes.

9. A wire mesh welding machine as claimed in claim 8, further comprising common adjustment means for simultaneously adjusting a prestress in all of said thrust spring means.

10. A wire mesh welding machine as claimed in claim 1, further comprising a thrust block at the upper end of each of said thrust transmitting devices, and means for moving each of said thrust blocks between an operative position wherein said thrust block engages with said common thrust beam to transmit a thrust from said beam to said thrust transmitting device and a retracted inoperative position in which said block is out of engagement with said beam.

11. A machine as claimed in claim 1, further comprising means mechanically connecting said thrust transmitting devices to said common thrust beam, said beam including two parts and guide means between said two parts, said guide means allowing said thrust transmitting devices to be adjusted in position individually across said machine.

12. A machine as claimed in claim 11, further comprising an electrode holder for each of said second electrodes and means detachably mounting each of said second electrodes in said holders.

13. A machine as claimed in claim 3, further comprising a transverse wire feeding device attached to each of said thrust transmitting devices, each of said feeding devices being operative to push said transverse wires against said mechanical stop of said contact unit, and common drive means for operating all of said transverse wire feeding devices.